July 31, 1962 — A. E. LEISTI — 3,046,688
DEVICE ON A SPOON-HOOK
Filed Dec. 4, 1959 — 2 Sheets-Sheet 1

AIMO EMIL LEISTI
INVENTOR.

BY *Albert M. Parker*

ATTORNEY.

July 31, 1962   A. E. LEISTI   3,046,688
DEVICE ON A SPOON-HOOK

Filed Dec. 4, 1959   2 Sheets-Sheet 2

AIMO EMIL LEISTI
INVENTOR.

BY Albert M. Parker
ATTORNEY.

United States Patent Office 3,046,688
Patented July 31, 1962

3,046,688
DEVICE ON A SPOON-HOOK
Aimo E. Leisti, Puistotie 6, Kotka, Finland
Filed Dec. 4, 1959, Ser. No. 857,439
3 Claims. (Cl. 43—35)

This invention relates to spoon-hooks and is particularly concerned with means for preventing said hooks from getting caught in seaweed while maintaining them in effective condition for catching fish.

In the more commonly known spoon-hooks, the hook is rigidly attached to the spoon by being riveted to it or is secured in some other way so that in any event the point of the hook faces outwardly from the spoon. To protect the point of the hook from catching in seaweed or other unwanted material in the water, it is common practice to attach one or more metal threads to the top end of the spoon-hook with the end of the thread or threads falling free over the point of the hook. When fish nibble at the spoon-hook, such threads tend to be pressed inwardly and expose the point of the hook. It has been found, however, that thread protection alone does not fully protect the spoon-hook from seaweed because marine plants of a light pliable variety easily tangle along the thread and get caught in the hook. The protecting threads also manifest a tendency to get twisted and break. Besides this, they may also prevent the fish from getting firmly caught.

The aim of the instant invention is to eliminate the foregoing and other drawbacks of prior art spoon hooks. It does so by employing a spoon-hook construction in which the hook itself is of the Kirby type. This type of hook instead of having the shaft and hook portion all lying in a single plane, has the rounded base portion bent laterally with respect to the main shaft portion so that the short arm carrying the barbed and pointed end of the hook extends at a small angle with respect to the main shaft of the hook and thus terminates with its point positioned off to the side from the main shaft. Such a Kirby type of hook is secured under spring pressure at its upper end to the upper end of the spoon. This securement enables the hook to revolve so it can be turned into a position with its hook and lying against the surface of the spoon adjacent to the bottom end thereof in which position it is releasably maintained by the spring action. In this position the laterally extending portion of the hook carrying the barb and the point lies on one side of the hook shaft. Thus the projection of the line of the hook shaft lies on one side of a line drawn between the eye end of the shaft and the point where the hooked portion of the hook engages the spoon. The effect of this is that when pressure is applied to the hook shaft, the shaft moves towards the spoon, the hook rotates and turns to its operating position with the point and barb portion pointing outwardly from the spoon.

Preferably, the hook is disposed so that in its protected position, it lies against the concave side of the spoon. It is also desirable to have the short arm of the hook carrying the point and barb bent in such a manner that it has two points of contact with the spoon where it lies against the same. Thus, a triangle is formed between two such points and the point of support at the upper end of the hook shaft. Accordingly, the projection of the line of the hook shaft on to the spoon falls outside of this triangle.

To further ensure that the hook is not released until it is intended that it be so, it is preferable to form a groove in the body of the spoon, running in the direction of the laterally bent arm portion carrying the point and barb. The latter arm then lies in that groove, preferably being in contact at the base thereof at the two points of support above mentioned.

In the accompanying drawing in which there are shown as examples two different embodiments of the spoon-hook according to the invention:

FIG. 7 is a view similar to FIG. 3, again differing in employing the FIG. 5 spring, while

Figure 1:
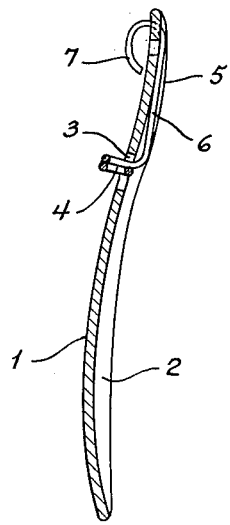
FIG. 1 is a central vertical section of a spoon according to the invention carrying only the retaining spring, such section being on the center line of FIG. 2.
Figure 2:
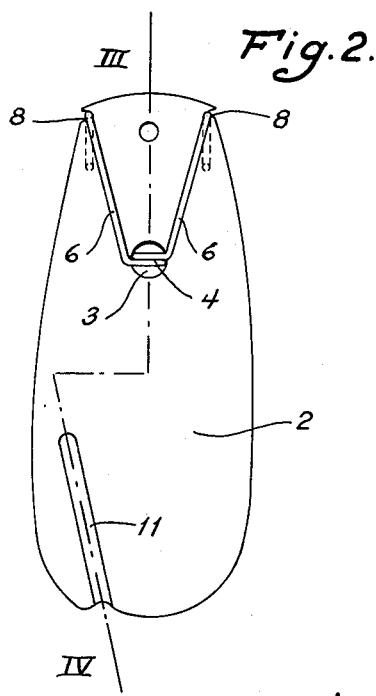
FIG. 2 is an elevation of the spoon as seen from its concave side carrying the retaining spring but without the hook.
Figure 3:
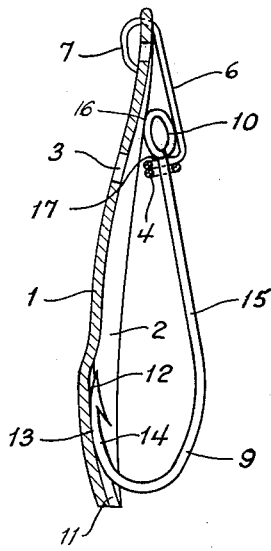
FIG. 3 is a vertical section taken on line III—IV of the spoon of FIG. 2 with the hook secured thereto and in protected position.

Referring to the embodiment of FIGS. 1 to 4, the spoon shown therein has the convex side indicated at 1 and the concave side thereof indicated at 2. Part way down from the top of the spoon a centrally located hole 3 is formed through the same. A V-shaped spring generally indicated at 5 overlies this upper part of the spoon and its lower portion terminates in a laterally offset eye 4, which overlies the hole 3 and extends through it when the spring is relaxed without a hook applied thereto. The spring has a pair of shanks 6 extending upwardly from the eye 4 and overlying the concave side 2 of the spoon. In this embodiment the shanks 6 terminate at their upper end in loops 7 which lie in notches 8 formed in the opposite upper corners of the spoon. These loop portions 7 have their principal extent adjacent the convex surface 1 of the spoon. When the spring is relaxed the ends of the loop 7 may be spaced a short distance away from the surface 1, but when the spring is placed under stress, as seen in FIG. 3, these ends engage that surface to assist in effecting the stressing of the spring.

Figure 4:
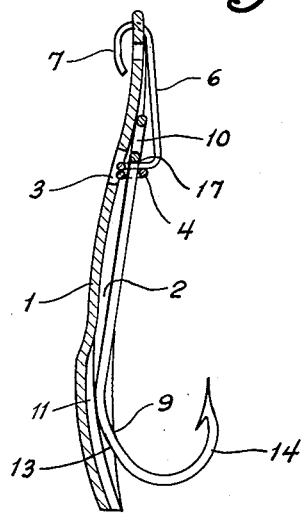
FIG. 4 is a view similar to FIG. 3 but showing the hook released and in operating position.
Figure 5:
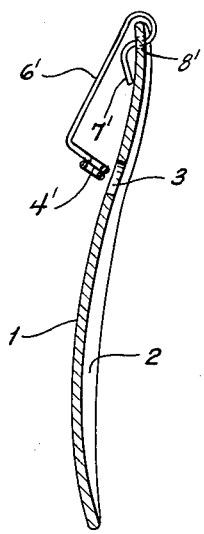
FIG. 5 is a view similar to FIG. 1 showing the spoon with a modified form of retaining spring carried thereby.
Figure 6:
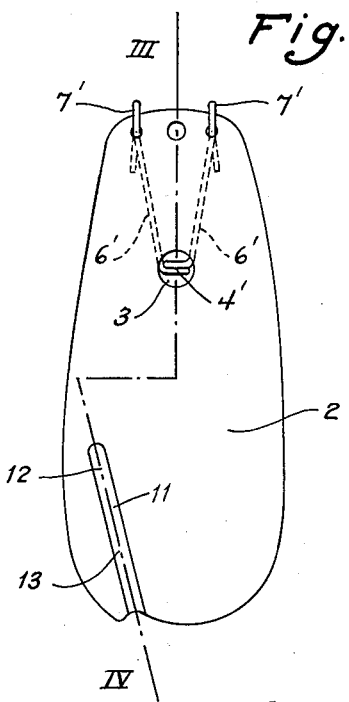
FIG. 6 is a view similar to FIG. 2, but employing the FIG. 5 spring.

FIGS. 3 and 4 show the spoon equipped with the hook 9 of the Kirby type as above described. This hook 9 is provided with eye 10 at upper end of its shaft 15. This eye is larger than the opening provided by the eye 4 of the spring 5; thus to seat the hook in a position carried by the spring, it is necessary to pass the barbed end 14 of the hook through the eye 4 and then pass the shank 15 down through the eye 4 until the larger eye 10 comes into engagement with the eye 4.

In order to bring the hook 9 to its protected position, as seen in FIG. 3, it is rotated so that its hooked portion 14 lies with its two points of support, indicated at 12 and 13, on the inner surface of the spoon. As here shown, this surface has a groove 11 formed therein and the portion 14 is seated within that groove with the points 12 and 13 lying therein. The groove 11, as seen in FIG. 2, extends in the same direction as that of the point or arm portion 14 of the hook 9. From the showing in FIG. 3 it will be apparent that when the hook is turned into the protected position, the spring 5 is put under stress and tends to press the shaft 15 against the concave side of the spoon. Due to this pressing action the eye 10 is engaged with the inner surface of the spoon at the point 16 which with the points 12 and 13 forms a triangle within which lies the point of pressure 17 of the spring. The shaft 15 of the hook, however, falls outside of this triangle and is thus clearly apparent that when ordinary pressure is applied to the shaft 15 while the hook is in the FIG. 3 position, such as by a fish nibbling, the hook will rotate so that the arm 14 comes out of the groove 11 and is exposed to hook into the fish. Prior to the application of such pressure, however, any extraneous objects in the water such as seaweed will slide right by the hook without tripping it from its protected position into its exposed or operating position, as seen in FIG. 4.

Figure 7:
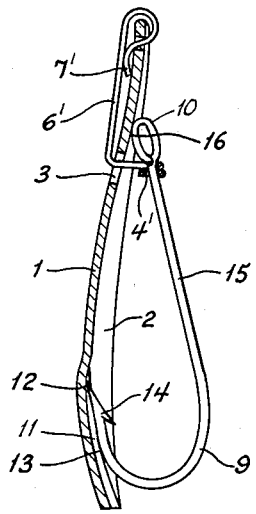
Figure 8:
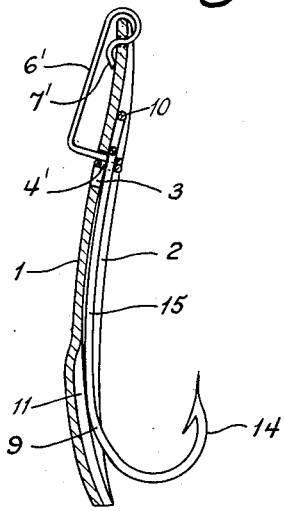
FIG. 8 is a view similar to FIG. 4, differing in employing the FIG. 5 spring.

In the modification of FIGS. 5 to 8, the hook and the spoon are duplicated and so carry the same reference characters. The spring, however, is somewhat different so its parts are indicated by primed characters. Here the spring lies principally on the back of the convex side of the spoon so in the relaxed position of FIG. 5, the eye 4' also lies on the back of the spoon but in alignment with the opening 3. The eye 4' forms the lower terminating portion of the shanks 6' which are looped over the spoon top extending around to the concave side 2 of the spoon and then back through holes 8' formed in the spoon to the partially bent terminating portion 7'. Thus when a hook as seen in FIGS. 7 and 8, is to be applied to this spring the shanks 6' are pushed toward the body of the spring so that the eye 4' is projected through the hole 3. This places the spring under stress since the terminating ends 7' are engaged with the surface of the spoon. Holding the spring in this position the hook 9 is again passed through the eye 4' until its eye 10 comes into engagement therein. When the hook 9 is turned into protected position, as seen in FIG. 7, it is held there by the pulling action of the spring causing the hook to engage the spoon at the three contact points 12, 13 and 16.

In this instance, when the hook is released by pressure against the shaft 15, portions of the arms 6' carrying the eye 4' act to rotate the hook to the operating position, pulling the eye 10 against the concave surface of the spoon.

Although in the foregoing the preferred and a modified form of the invention have been illustrated and described, it is of course to be understood that such showing and description are for illustrative and not for limiting purposes; it being understood that since certain changes may be made in the above article and different embodiments of the invention could be made without departing from the scope thereof, it is intended that all matter contained in the above description or shown in the accompanying drawings shall be interpreted as illustrative and not in a limiting sense.

Having described my invention what I claim is new and desire to secure by Letters Patent is:

1. In a spoon hook, a spoon, means for mounting a hook thereon, and a hook of the Kirby type carried by said mounting means, said mounting means including means for mounting the upper end of the shaft of said hook on said spoon adjacent the upper end thereof, said mounting means including resilient means for holding said upper end of said hook in engagement with the surface of said spoon and said mounting means and said hook being formed for rotation of said hook with respect to said mounting means, the barbed end of said hook being carried by an arm portion extending laterally from the line of the shaft of said hook, said spoon being formed with a groove therein co-extensive with said arm of said hook, said arm being seated in said groove in the protected position of said hook, said resilient mounting means serving to hold said hook with said arm in engagement with said spoon in said protected position with a projection of the line of said hook shaft falling on said spoon to the side of a line drawn between the respective points of engagement of said upper end of said hook and of said arm with said spoon, whereby, when pressure is applied to said shaft, said hook is released from said protected position and rotates into an operational position with said barbed end of the hook facing outwards.

2. In a spoon hook as in claim 1, said means formed for rotation including an eye at the upper end of said shaft, said eye having an edge portion thereof in contact with said spoon in the protected position of said hook and having a substantially flat face in contact with said spoon in said operational position.

3. In a spoon hook as in claim 1 said arm being formed to bear against the surface of said spoon at two points of contact.

References Cited in the file of this patent

UNITED STATES PATENTS

| | | |
|---|---|---|
| 1,124,719 | Fischer | Jan. 12, 1915 |
| 2,597,035 | Rickard | May 20, 1952 |

FOREIGN PATENTS

| | | |
|---|---|---|
| 105,804 | Sweden | Oct. 27, 1942 |